United States Patent [19]
Cuadros

[11] Patent Number: 5,745,518
[45] Date of Patent: Apr. 28, 1998

[54] EXPLOSIVELY PUMPED LASER APPARATUS

[75] Inventor: Jaime Cuadros, Hacienda Heights, Calif.

[73] Assignee: Hughes Missile Systems Company, Los Angeles, Calif.

[21] Appl. No.: 599,199

[22] Filed: Feb. 9, 1996

[51] Int. Cl.⁶ .................... H01S 3/091; H01S 3/20
[52] U.S. Cl. .................. 372/70; 372/77; 359/345
[58] Field of Search ................ 359/345; 372/70, 372/77, 72, 76

[56] References Cited

U.S. PATENT DOCUMENTS

| | | | |
|---|---|---|---|
| Re. 26,420 | 7/1968 | Wanlass | 372/77 |
| 3,271,696 | 9/1966 | De Ment | 372/70 |
| 3,309,620 | 3/1967 | De Ment. | |
| 3,451,008 | 6/1969 | Dunne | 372/77 |
| 3,453,558 | 7/1969 | Abegg et al. | |
| 3,618,526 | 11/1971 | Baker | 372/70 |
| 3,646,471 | 2/1972 | De Ment. | |
| 3,836,865 | 9/1974 | Koehler et al. | 372/77 |
| 4,016,500 | 4/1977 | Pilloff | 359/345 |
| 4,099,142 | 7/1978 | Hershkowitz et al. | |
| 4,371,969 | 2/1983 | Chicklis et al. | |
| 5,052,011 | 9/1991 | Piltch et al. | 372/77 |

*Primary Examiner*—Nelson Moskowitz
*Attorney, Agent, or Firm*—Charles D. Brown; Wanda K. Denson-Low

[57] ABSTRACT

An explosively pumped laser module has a concentrically-arranged laser rod and surrounding sleeve of explosive material with an annular gas chamber formed between the explosive sleeve and laser rod. An explosive initiation assembly surrounds the explosive sleeve with a plurality of detonator points or pads positioned symmetrically about the explosive sleeve. The assembly is connected to a central firing device or detonator via equal length pathways between each detonator point and the central firing device, so that the explosive is simultaneously detonated at a plurality of different points.

6 Claims, 2 Drawing Sheets

EXPLOSIVELY PUMPED LASER APPARATUS

BACKGROUND OF THE INVENTION

The present invention relates generally to lasers and is particularly concerned with explosively pumped lasers in which laser emission is stimulated by light generated in a noble gas as a result of shock waves produced by high explosives. These types of lasers are often used in weapons and other fields.

It is well known that noble gases such as argon, krypton and xenon emit light when shocked by an explosion. This property has been used in the past for explosively pumping a laser. In explosively pumped lasers, an explosive material is disposed around the laser and a noble gas is contained between the laser and the explosive. The explosive is detonated and the detonation wave from the explosive passes through the noble gas, raising its temperature and pressure to a point where light is emitted. The high intensity light is transmitted to the laser rod and produces a sufficiently high energy level for coherent light to be emitted. This produces a high intensity pulse of radiation which can be used in various military and other applications. One type of explosively pumped laser device is described in U.S. Pat. No. 3,451,008 of Dunne, in which a laser is mounted in a containment vessel having an inner wall lined with explosive material. Explosive sheets extend radially from the wall towards the laser rod to form separate chambers, and detonators are placed centrally on the explosive in the various chamber sections.

One problem with explosively pumped lasers in the past has been that they have exhibited low efficiency in conversion from chemical to light energy, because of attenuation of the light as it travels to the laser rod, for example.

SUMMARY OF THE INVENTION

It is an object of the present invention to provide a new and improved explosively pumped laser apparatus.

According to the present invention, a laser apparatus is provided which comprises an outer casing, a cylinder of explosive material positioned inside the casing, a laser rod extending co-axially along the central longitudinal axis of the explosive cylinder to define an annular chamber between the laser rod and cylinder for containing a noble gas, a plurality of detonator pads arranged on the explosive cylinder, the detonator pads being positioned in a symmetrical arrangement at spaced intervals both around and along the length of the explosive cylinder, a suitable firing device for actuating the detonator pads such as a battery in the case of electric detonators or an explosive detonator in the case of percussion detonators, and connecting lines extending between the firing device and each of the detonator pads, the length of all the connecting lines being equal so that the detonator pads will all be ignited substantially simultaneously. The connecting lines will be conductive wires in the case of electric detonators, and detonator cord in the case of percussion detonators.

The multiple detonation pads initiate the explosive at symmetrical points on its outer surface, so that the detonation front propagates radially inwardly and impinges symmetrically on the annular gas layer along the entire length of the gas chamber. The gas layer is excited to luminescence at the same instant along its entire length, so that the light travels radially inwardly to impinge on the rod. Because of the short distance which must be travelled by the light, attenuation due to absorption is reduced, increasing the efficiency of the light output.

In one preferred embodiment of the invention, a disc of attenuator material is secured across one end of the explosive cylinder, and a central initiation point is located at the center of the disc. The firing device may be located at the central initiation point, or connected to it. A plurality of radial connecting lines project radially outwardly from the central initiation point to the outer periphery of the disc, and longitudinal connecting lines extend from the radial connecting lines at outer periphery of the disc along at least part of the length of the explosive cylinder. A plurality of side connecting lines extend from each of the longitudinal lines to the detonator pads located the closest to each side of the respective longitudinal connecting line, so that each longitudinal connector line is connected to a group of detonator pads. The arrangement is such that the net path length from the central initiation point to each detonator pad is the same.

Preferably, a sleeve of attenuator material surrounds the outer surface of the explosive cylinder. The detonator pads and longitudinal and side connecting lines are encased in the attenuator sleeve with the detonator pads being located at the inner surface of the attenuator sleeve.

The concentric and symmetrical assembly of the explosive detonation relative to the laser rod ensures that the light has to follow only a short radial path to impinge on the laser rod, reducing attenuation and thus increasing efficiency.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
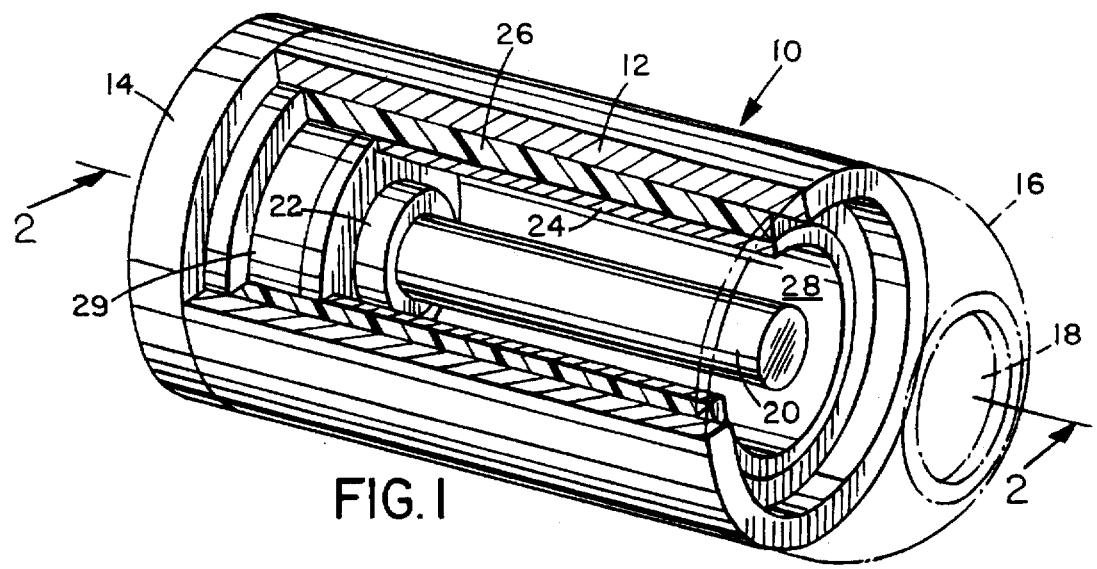
FIG. 1 is a cut-away perspective view of a laser module according to a preferred embodiment of the invention.

The drawings illustrate an explosively pumped laser module 10 according to a preferred embodiment of the present invention. The module 10 has a cylindrical outer casing 12 having a closed rear end wall 14 and a removable end cap 16 having a central window 18 for fitting over the open forward end of the casing.

Concentrically mounted within the casing are a central laser rod 20 which projects forwardly along the central axis of the casing from fitting 22 at the rear end of the casing, a cylinder or sleeve 24 of explosive material surrounding the laser rod and extending along the length of the rod, an explosive initiation assembly 25 surrounding the explosive sleeve, and a cylindrical outer sleeve 26 of conventional attenuator material such as plastic encasing the initiation assembly 25 and surrounding the explosive cylinder 24. Sleeve 26 fills the annular space between the outer surface of the explosive cylinder and the inner surface of the casing 12. The laser rod is of any conventional laser material. An annular gas chamber 28 for containing a noble gas is defined between the laser rod and inner surface of the explosive cylinder. An annular disc 29 of attenuator material is located between the laser rod fitting 22 and the end wall 14 of the casing for isolation purposes.

Figure 2:
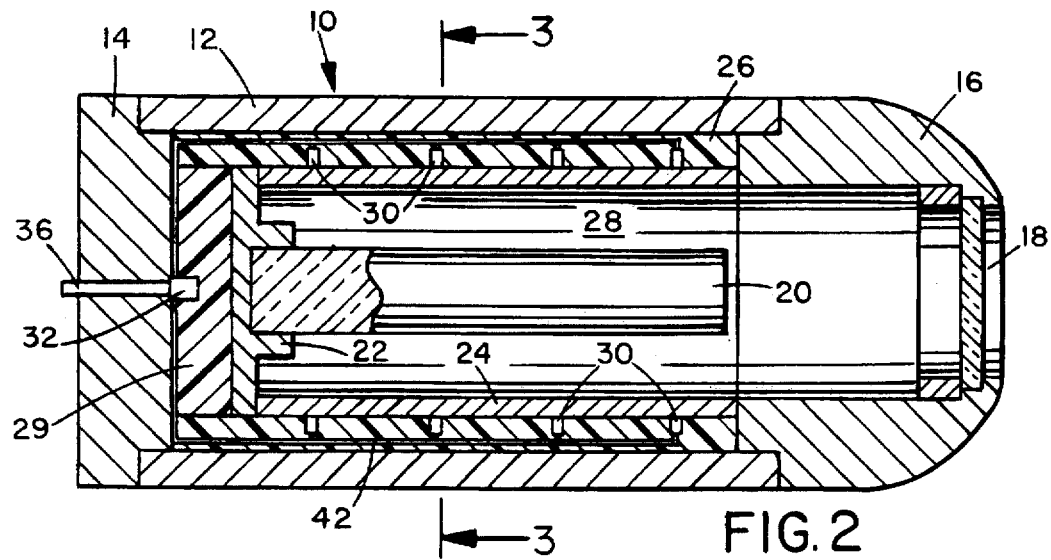
FIG. 2 is a sectional view taken on line 2—2 of FIG. 1.
Figure 3:
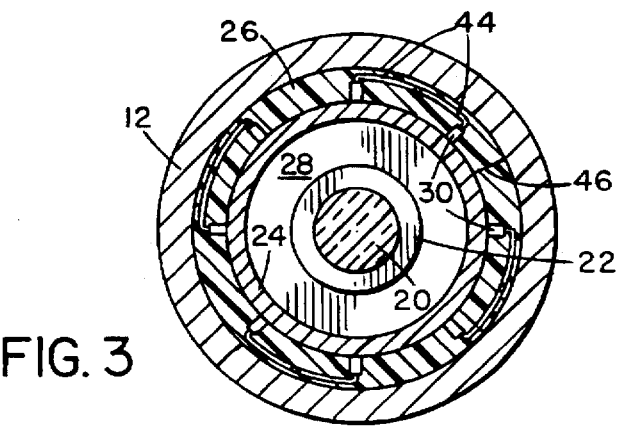
FIG. 3 is a sectional view taken on line 3—3 of FIG. 2.

The explosive initiation assembly comprises a plurality of detonator pads 30 which are embedded in the inner surface of the attenuator sleeve surrounding the explosive cylinder. The detonator pads are arranged symmetrically around the surface of the explosive cylinder and at spaced intervals along the length of the cylinder, as illustrated in FIGS. 2 and 3. Each detonator pad is connected to a central firing device or detonator via connecting pathways which extend from the respective detonator pads to a central initiation point 32 at the rear end of the casing. The firing device may be a detonator located at the central initiation point, as illustrated in FIG. 2, or may be a power source connected to the central initiation point by wiring 36 extending through the end wall of the casing. Central initiation point or detonator 32 is located at the center of the attenuator disc 29 between the disc and end wall of the casing, with suitable connecting leads or the like 36 extending through the end wall for connection to a suitable actuator. The detonator pads 30 may be any type of detonator, for example percussion or electric detonators. In the case of percussion detonators, the pads 30 will be connected by detonator cord to central detonator 32, which is connected to a suitable energy source via wiring 36. In the case of electric detonators, the connecting - paths will be conductive lines which extend to the central initiation point and out via end wall 14 to a battery or other power source.

Figure 4:
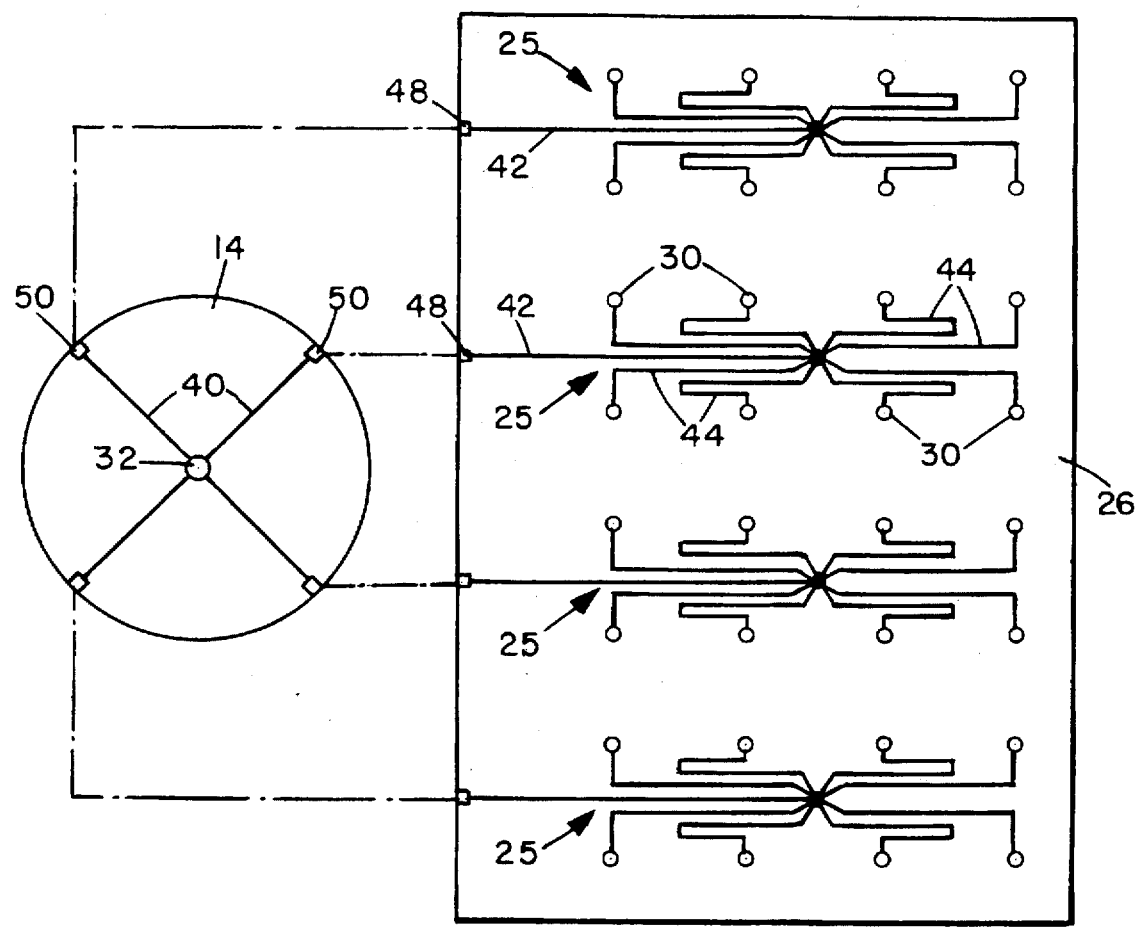
FIG. 4 is a diagram of the equal path length connections to the detonators.
Figure 5:
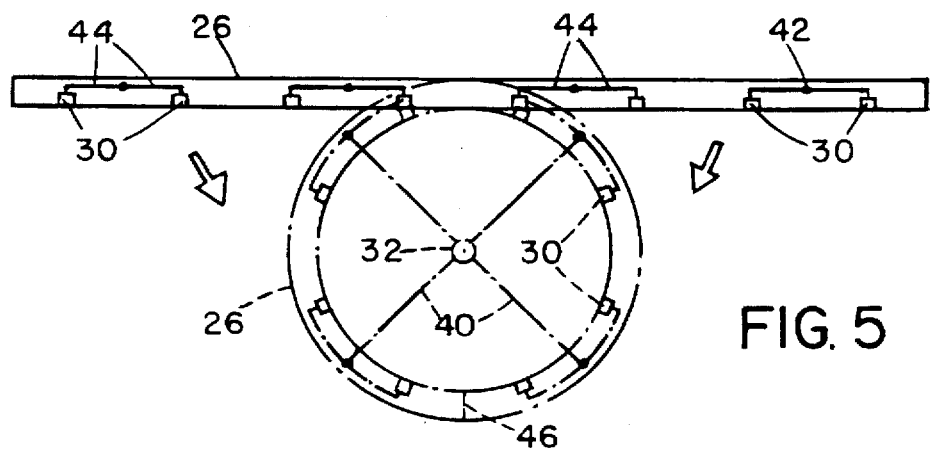
FIG. 5 illustrates the rolling of the detonator assembly to fit around the explosive sleeve.

The connecting paths between each detonator pad and the firing device are arranged to be of substantially equal length, so that they will detonate substantially simultaneously. FIGS. 4 and 5 illustrate one possible arrangement of detonator pads and connecting paths to achieve this result. In this arrangement, detonator pads 30 are arranged in circumferentially-spaced longitudinal rows around the inner surface of the attenuator sleeve. The central initiation point 32 is connected to the pads via radial connecting lines 40 projecting outwardly from the point 32 to the outer periphery of disc 29, and longitudinal connecting lines 42 which project from each radial connecting line at the outer edge of disc 29 between adjacent pairs of detonator pad rows. A plurality of side connecting lines 44 extend from the end of each of the longitudinal connecting lines to the detonator pads in each of the adjacent rows, with the lines to the closest detonator pads being more tortuous to ensure an equal path length to all detonator pads, as best illustrated in FIG. 4.

The longitudinal and side connecting lines are all embedded in the attenuator material of sleeve 26, for example by molding the sleeve as a flat sheet with the detonator pads and connecting lines or leads in place as illustrated in FIG. 4. The sheet can then be rolled or bent with the detonator pads facing inwardly, as illustrated by the arrows in FIG. 5, and suitably secured together along seam 46 to form a cylindrical sleeve around the explosive cylinder or sleeve. The ends 48 of the longitudinal connecting lines are then secured to the ends 50 of the radial connecting lines. The attenuator separates the initiation pads and connecting lines, and also protects the outer case against the explosion.

With this arrangement, when the central firing device or detonator 32 is actuated, the initiation signal propagates through the various connecting lines to the equidistant set of detonator pads 30 encased in the attenuator. The detonator pads are thus ignited simultaneously to initiate the explosive at the symmetrically-positioned set of points about the outer surface of the explosive. The detonation front propagates radially inwardly through the relatively thin layer of explosive at a rate that can approach 10 mm per microsecond, depending on the type of explosive chosen, and emerges at the inner surface of the explosive, where it impinges on the gas layer and excites it to luminescence. Light will be emitted from the shocked front of the gas simultaneously along the length of the gas chamber, and will travel radially inwardly through the gas at the speed of light to impinge on the laser rod and pump the laser. The explosive shock front travels in the same direction, but at a lower speed, and eventually impinges on the rod and destroys it. In the meantime, an intense beam of coherent light is produced by the laser and propagates through the window of the casing to a selected target. The detonation velocity, which is dependent on the type of explosive material used, can be selected to provide sufficient time for the laser rod to lase before it is destroyed.

It is desirable that the explosive cylinder or sleeve be kept as thin as possible to reduce the time taken for the detonation front to propagate through the explosive. However, at the same time the run-up distance for the particular explosive to transition to detonation must be taken into account.

This arrangement reduces the distance that light has to travel through the gas in order to reach the laser rod, since light will be generated equally along the length of the gas chamber to propagate radially inwardly in the shortest possible path to the laser rod, instead of having to travel along part or all of the length of the chamber in order to reach all parts of the rod. Thus, attenuation due to absorption of light as it travels through the gas is reduced. The symmetrical, concentric arrangement of the laser, explosive material, and initiation or detonation scheme provides the desired short path length to the laser rod.

Another advantage of this arrangement is that it lends itself easily to experimental evaluation of the use of different explosives, as well as evaluation of other parameters such as the use of Mach Stem excitation. The varying pressures and temperatures produced by different explosives, including aluminized explosives, can be measured using this apparatus.

The laser module may be one-shot or multi-shot. In the latter case, the expended laser rod, explosive and attenuator sleeve can be removed from the casing in one piece and replaced with a new unit from a magazine. The design lends itself readily to design variations. If the case is made very rugged, the need for a gun or launcher is removed and a one shot weapon can be made.

Although a preferred embodiment of the invention has been described above by way of example only, it will be understood by those skilled in the field that modifications may be made to the disclosed embodiment without departing from the scope of the invention, which is defined by the appended claims.

I claim:

1. An explosively pumped laser apparatus, comprising:

an outer casing;

a laser rod mounted in the casing;

a hollow cylinder of explosive material encircling the laser rod and extending coaxially along the length of the laser rod to define an annular gas chamber for containing noble gas between the laser rod and explosive cylinder;

a plurality of detonator pads arranged on the explosive cylinder for detonating the explosive material, the pads being located at longitudinally spaced intervals along the entire length of the cylinder, and at spaced intervals around the circumference of the cylinder;

firing means for actuating the detonator pads;

connecting paths between each detonator pad and the firing means for connecting the firing means to the detonator pads, the connecting paths being of approximately the same length for simultaneous actuation of all the detonator pads;

said firing means having a central initiation point at one end of said explosive cylinder, and said connecting paths extend from said central initiation point to said detonator pads;

said detonator pads being arranged at spaced intervals along a plurality of longitudinal rows extending parallel to the laser rod, the rows of spaced detonator pads being located at spaced intervals around the periphery of the explosive cylinder; and the connecting paths including a plurality of radial connecting lines projecting radially outwardly from said central initiation point to the outer periphery of one end of said explosive cylinder, a plurality of longitudinally-extending connecting lines extending parallel to said laser rod from said one end along at least part of the length of said cylinder, each longitudinal connecting line extending from the end of a respective one of said radial connecting lines between an adjacent pair of rows of detonator pads, and a plurality of side connecting lines extending from each longitudinal connecting line to all of the detonator pads in the adjacent rows.

2. The apparatus as claimed in claim 1, including an attenuator sleeve surrounding the explosive cylinder.

3. The apparatus as claimed in claim 1, including an outer sleeve of attenuator material surrounding said explosive cylinder, said detonator pads being embedded in the inner surface of said attenuator sleeve facing said explosive cylinder, and the longitudinal and side connecting lines being embedded in said attenuator sleeve.

4. The apparatus as claimed in claim 1, wherein the distance from said central initiation point along said radial, longitudinal and side connecting lines to each of said detonator pads is the same.

5. The apparatus as claimed in claim 4, wherein each longitudinal connecting line has an end arranged at a central position between the respective adjacent pair of detonator rows, and said side connecting lines include a respective side connecting line extending from said end of each longitudinal connecting line to each of said detonator pads in the respective adjacent rows, the side connecting lines to the detonator pads located closest to the end of the respective connecting line being tortuous, whereby the length of the side connecting lines to the closest detonator pads is the same as the length of the side connecting lines to detonator pads located further away from the end of the longitudinal connecting line.

6. The apparatus as claimed in claim 1, wherein said annular gas chamber is a continuous chamber extending from an inner surface of said hollow explosive cylinder up to said laser rod.

* * * * *